No. 631,170. Patented Aug. 15, 1899.
A. LICHT.
EYEGLASSES.
(Application filed Mar. 13, 1899.)
(No Model.)

Witnesses  Adam Licht, Inventor.

UNITED STATES PATENT OFFICE.

ADAM LICHT, OF NEWARK, NEW JERSEY.

EYEGLASSES.

SPECIFICATION forming part of Letters Patent No. 631,170, dated August 15, 1899.

Application filed March 13, 1899. Serial No. 708,873. (No model.)

*To all whom it may concern:*

Be it known that I, ADAM LICHT, a citizen of the United States, residing at Newark, in the county of Essex and State of New Jersey, have invented new and useful Eyeglasses, of which the following is a specification.

This invention relates to eyeglasses; and the object of the invention is to provide an attachment more especially applicable to that class of glasses known as "frameless," and the device is of such a nature that chipping, breaking, or fracturing a lens is prevented at that place through which the pin or screw that joins the nose-piece or like part to the glass passes. This peculiar advantage is obtained by inserting an elastic bearing or bushing in such pin-hole and which receives the pin, by reason of which the latter cannot act directly against the glass, which is of extreme importance when the screw becomes loose, as there is a marked tendency on the part of the latter to chip the glass. I prefer to extend this bearing or bushing beyond the opposite faces of the lens, so that the projecting ends of the same are interposed between the ears or lugs at the end of the nose-piece and the glass, whereby said ears are clamped thereon. Said projecting ends will be upset and spread upon the surface of the lens and receive direct bearing of the ears, and thus serve as pads to obviate cracking of the glass due to the lateral or sidewise motion of the nose-piece.

From the preceding it will be understood that my invention includes, broadly, an eyeglass having a lens, a nose-piece or analogous device, a pin joining the nose-piece and the lens, and an elastic bearing between the pin and the lens.

With these ends in view the invention consists in the novel combination of elements and in the construction and arrangement of parts which will be hereinafter fully described and claimed.

To enable others to understand the invention, I have illustrated the preferred embodiment thereof in the accompanying drawings, forming a part of this specification, and in which—

Figure 1:
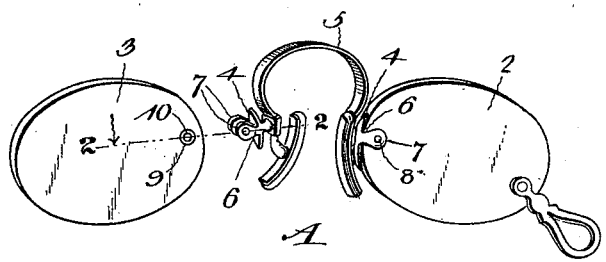
Figure 4:
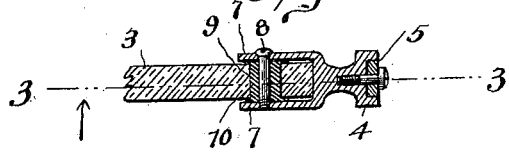
Figure 2:
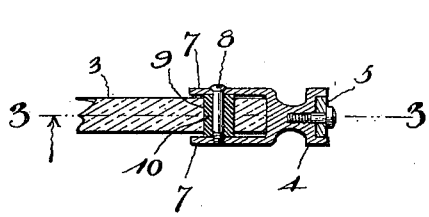
Figure 3:
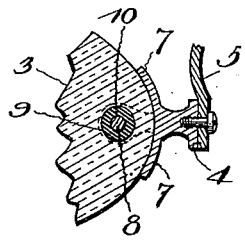

Figure 1 is a perspective view of a pair of eyeglasses constructed in accordance with my invention and showing one of the lenses as separated from the nose-piece. Fig. 2 is a cross-section taken on the line 2 2, Fig. 1, and the parts shown as connected. Fig. 3 is a section taken on the line 3 3, Fig. 2. Fig. 4 is a view similar to Fig. 2, showing the ends of the elastic tube spread and interposed between the ears and the lens.

Like characters denote like and corresponding parts in each of the several figures of the drawings.

In the drawings I have represented a pair of eyeglasses, and the same is denoted by A, and it has the lenses 2 and 3, the latter being removed from the nose-piece 4 in Fig. 1. The nose-piece has the usual bowed spring 5, to the opposite ends of which are secured the coupling members 6, which fit against the adjacent edges of the two lenses and which are provided with ears or lugs 7, adapted to overlap and to snugly receive both lenses. The coupling members are united to the lenses by means of screws 8, which extend entirely through the openings 9 in the lenses and which are in threaded engagement with one of the ears or lugs 7 of the respective coupling members.

For the purpose of preventing the screws from chipping the walls of the openings through which they pass I dispose between the screws and the lenses elastic bearings, as 10, consisting of rubber sleeves tightly fitting within the openings and directly receiving the connecting pins or screws 8, so that the latter cannot come in contact with the glass. It will be understood that the pins or screws are separate or independent of the coupling members 6 and that the bearings 10 entirely surround the said pins or screws, so as to thoroughly protect the glass.

As a means for preventing the ears or lugs 7 from breaking the glass I project the bearing-sleeves 10 beyond the opposite faces of the lenses, so that said lugs or ears when clamped thereagainst will upset and spread them against the lenses, forming beads to receive direct bearing of the ears, so that they cannot bear against the lenses.

From the preceding description it will be obvious that chipping, breaking, or fracturing of the glass is prevented at and around the screw-openings either when the screws are tight in their seats or when they become loose, it being understood that the liability of injuring the glass is greater when the screws are loosened. Not only does this advantageous result follow, but the lenses can in no wise be affected by the coupling members at the ends of the nose-piece when such a contingency as that pointed out arises.

Changes in the form, proportion, size, and the minor details of construction within the scope of the appended claim may be resorted to without departing from the spirit or sacrificing any of the advantages of this invention.

Having thus described the invention, what I claim is—

In eyeglasses, the combination with a lens and a part to be united thereto, said part including ears adapted to receive the edge of the lens between them, of a perforation in the lens, an elastic tube seated in said perforation with its ends projecting beyond the surface of the lens and adapted to be flared outwardly upon the surface of the lens, perforations in said ears in alinement with the bore of the tube, and a clamping-screw passed through said bore and perforations and adapted to clamp said ears upon the ends of the tube to flare them upon the faces of the lens between the lens and said ears, substantially as described.

In testimony that I claim the foregoing as my own I have hereto affixed my signature in the presence of two witnesses.

ADAM LICHT.

Witnesses:
PERRY G. K. UNDERWOOD,
GEORGE W. WILT.